United States Patent [19]

Ferris et al.

[11] Patent Number: 4,520,912

[45] Date of Patent: Jun. 4, 1985

[54] HYDRAULICALLY ACTUATED STARTING CLUTCH ASSEMBLY

[75] Inventors: Ernest A. Ferris, Oak Brook; John W. McColl, Broadview, both of Ill.

[73] Assignee: Borg-Warner Corporation, Chicago, Ill.

[21] Appl. No.: 434,807

[22] Filed: Oct. 18, 1982

[51] Int. Cl.³ .................... F16D 25/064; F16D 25/14
[52] U.S. Cl. ..................... 192/85 AA; 192/0.075; 192/106 F
[58] Field of Search ........... 192/85 AA, 106 F, 70.19, 192/70.2, 70.28, 89 B, 99 A, 0.076, 0.075

[56] References Cited

U.S. PATENT DOCUMENTS

| | | | |
|---|---|---|---|
| 940,679 | 11/1909 | Evans | 192/70.28 X |
| 2,256,699 | 9/1941 | Almen | 74/230.17 |
| 2,620,685 | 12/1952 | Smirl | 74/752 |
| 2,646,150 | 7/1953 | Hobbs | 192/85 |
| 2,966,978 | 1/1961 | Kaptur | 192/106 F |
| 3,176,813 | 4/1965 | Lee et al. | 192/85 |
| 3,190,421 | 6/1965 | Schulz | 192/85 AA |
| 3,213,984 | 10/1965 | Cook | 192/85 AA X |
| 3,236,349 | 2/1966 | Wiggins et al. | 192/85 AA X |
| 3,266,608 | 8/1966 | Lemieux | 192/85 AA |
| 3,301,142 | 1/1967 | Cenko | 192/85 AA |
| 3,375,734 | 4/1968 | Lemons | 74/689 |
| 3,747,731 | 7/1973 | Smirl | 192/104 R |
| 3,752,280 | 8/1973 | Cheek | 192/85 AA |
| 4,014,619 | 3/1977 | Good et al. | 192/70.2 X |
| 4,228,691 | 10/1980 | Smirl | 474/12 |
| 4,228,882 | 10/1980 | Huber et al. | 192/89 B X |
| 4,241,618 | 12/1980 | Smirl | 74/863 |
| 4,425,991 | 1/1984 | Hays | 192/99 A X |

FOREIGN PATENT DOCUMENTS

| | | | |
|---|---|---|---|
| 223177 | 1/1959 | Australia | 192/89 B |
| 1939987 | 2/1971 | Fed. Rep. of Germany | 192/85 AA |
| 940405 | 10/1963 | United Kingdom | 192/85 AA |

Primary Examiner—Rodney H. Bonck
Attorney, Agent, or Firm—James A. Geppert

[57] ABSTRACT

A hydraulically actuated starting clutch and more particularly a starting clutch for a continuously variable transmission which is located at the output of the transmission to couple the vehicle wheels to the engine upon a signal from the throttle induced system oil pressure. The clutch includes a cover connected to the drive shaft through a hub forming a pressure chamber behind a piston, a Belleville spring acted upon by the piston and urging a pressure plate against the clutch plate and an end plate secured in the cover. Weights are mounted on the Belleville spring to compensate for the centrifugal effect of the oil in the pressure chamber. The clutch plate is operatively connected to a sleeve shaft to drive the differential for the vehicle wheels.

9 Claims, 2 Drawing Figures

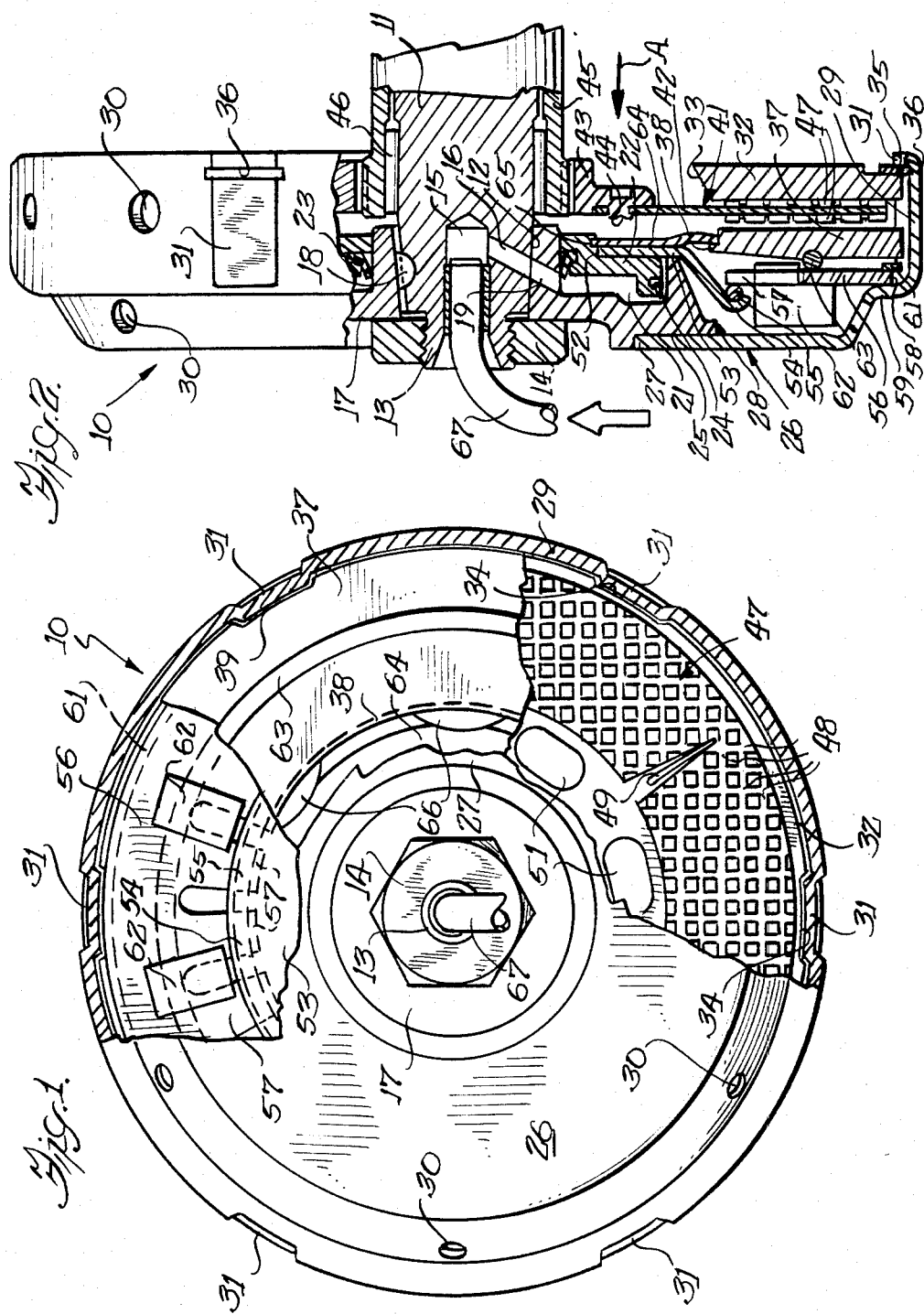

HYDRAULICALLY ACTUATED STARTING CLUTCH ASSEMBLY

BACKGROUND OF THE INVENTION

The present invention relates to a hydraulically actuated starting clutch and more specifically to a starting clutch assembly for a continuously variable transmission in an automotive vehicle. Continuously variable transmissions having been known for several years as a driving assembly between a vehicle engine and the road engaging wheels to provide a smooth acceleration without the usual gear shifting found in most automatic transmissions. A continuously variable transmission includes variable sheave pulleys, an endless belt extending between and engaging the pulleys, and control means to alter the effective pulley diameters and thus change the belt ratio.

In automotive applications, it is necessary to incorporate a hydrodynamic and/or clutch assembly as a starting device and planetary gearing to effect desirable gear reduction and to provide for forward-neutral-reverse gear mechanisms. It is desirable to have the pulleys constantly rotating when the vehicle engine is running, even at an idle rpm, so that starting of the vehicle is accomplished by a speed responsive friction starting device, such as a clutch, located at the output of the transmission, and a forward-neutral-reverse mechanism is desirably located in conjunction with or subsequent to the starting device.

In a starting clutch where actuation is dependent upon hydraulic pressure acting on the clutch engaging elements, and where circulating oil is utilized for cooling of the friction faces, the viscous drag resulting from the oil flowing between the clutch surfaces when the clutch is in its released state results in a condition where the clutch is not fully released. Therefore, unwanted driving input to the transmission is present after disengagement of the clutch. The undesirable vehicle "creep" that results often requires the use of a special brake in the system, an inefficient and costly extra. A possible solution to this problem is the strategic dumping of the cooling oil flowing to the clutch together with the clutch's ability to promptly respond.

Another problem resides in the resultant centrifugal force of a rotating clutch which traditionally provides liquid pressure that may influence actuation of the clutch. Further problems include engine stalling during rapid vehicle braking and lack of smoothness of clutch engagement during acceleration of the vehicle. The present invention overcomes these various problems in the form of a novel starting clutch assembly.

SUMMARY OF THE INVENTION

The present invention comprehends the provision of a novel starting clutch arrangement, particularly for a continuously variable transmission, which is located at the output of the transmission to make the device automatic in coupling the vehicle engine to the driving wheels upon a signal from the throttle induced system oil pressure. Where there is no throttle signal, the clutch will open "cleanly" enough to prevent vehicle creep due to viscous drag resulting from the cooling fluid flow between the clutch engaging surfaces. This clutch will also act as a torque "fuse" for the cone-belt drive system of the continuously variable transmission and is so sized as to slip before the metallic pulley belt slips.

The present invention also comprehends the provision of a starting clutch in the form of a hydraulically-operated wet clutch including a Belleville spring to multiply the hydraulic force of the piston to be exerted on the clutch pressure plate. Also, the Belleville spring carries centrifugal weights thereon to cancel the unwanted effects of hydraulic centrifugal "head" in the assembly at speeds of the order of 12,000 rpm. Also, the clutch is disengageable at 10,000 rpm by removal of the vehicle operator's foot from the throttle so as to avoid engine overspeed under conditions of electronic control failure.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a front elevational view of the starting clutch of the present invention with portions broken away to show the internal clutch structure.

FIG. 2 is a side elevational view of the clutch of FIG. 1 with portions in cross section.

DESCRIPTION OF PREFERRED EMBODIMENT

Referring more particularly to the disclosure in the drawing wherein is shown an illustrative embodiment of the present invention, FIGS. 1 and 2 disclose a hydraulically-actuated starting wet clutch 10 mounted on a driving shaft 11 from a continuously variable transmission (not shown), such as illustrated in U.S. Pat. No. 4,241,618. The shaft has a tapered end portion 12 terminating in a reduced threaded end 13 receiving an internally threaded nut 14; the end of the shaft having a blind passage 15 therein opening into the reduced end 13 and communicating with a plurality of generally radial feed holes or passages 16.

An annular hub 17 is received on the tapered end portion 12 and retained thereon by the nut 14; the axial force of the nut acting on the coned surfaces of the hub and shaft providing adequate frictional force to ensure rotation of the hub with the shaft. The hub includes a plurality of generally radial fluid passages 19 whose circular alignment with the corresponding feed passages 16 is ensured by the use of a key 18 received in a suitable recess or keyway; the passages leading to an annular recess or pressure chamber 21 accommodating an axially movable piston 22. The piston 22 includes inner and outer annular resilient lip seals 23 and 24 engaging the walls of the pressure chamber 21. On the face of the hub opposite to the chamber 21 is an annular recess 25 receiving the inner edge 27 of a clutch housing or cover 26 secured to the hub at 28 as by welding. The cover has an axially extending flange 29 provided with internal flattened ribs 31 (FIG. 1), and openings 30 are provided in the cover to allow outward flow of cooling fluid from the cover.

An end plate 32 has an inner beveled surface 33 and an outer periphery with axial channels or grooves 34 formed therein to receive the indented ribs 31 so as to rotate with the cover. A snap ring 35 is positioned in an annular groove 36 in the cover flange 29 and ribs 31 to retain the end plate in the cover. Also, an axially movable annular pressure plate 37 has an inner lip 38 and the outer periphery has axial channels 39 (FIG. 1) formed therein receiving the ribs 31. Between the end plate 32 and the pressure plate 37 is positioned a clutch plate 41 having a core plate 42 secured to a powdered metal hub 43 through headed bosses 44 received in openings in the core plate. The hub is internally splined to receive the splined end of a sleeve or driven shaft 45 encompassing the shaft 11 and rotatably mounted on bearings 46; the sleeve shaft 45 acting to drive the vehicle wheels through a suitable differential (not shown).

The clutch plate includes a pair of oppositely disposed friction facings 47,47 formed preferably of a non-asbestos, high coefficient material that is bonded to a cork cushion, which in turn is adhesively bonded to the core plate 42. The facings are provided with deep waffle grooving 48 and feeder slots 49 cut through the lining and into the cork to allow for high cooling oil flow (arrow A) through the clutch at low back pressure. The cooling oil can flow through perforations 51 in the core plate so as to cool both surfaces of the clutch plate. Oil is encouraged to linger in the annular "neighborhood" of the clutch plate by reason of the machined bevel surface 33 at the inner diameter of the end plate 32.

The face of the piston 22 has an annular recess 52 receiving the inner portion of a pressure disc 53 having an outwardly and forwardly inclined portion terminating in a curled edge 54 receiving a wire hoop or pressure ring 55 which engages the inner ends of the fingers 57 of a Belleville spring 56. The periphery 58 of the spring is positioned between a shoulder 59 formed in the corner of the cover 26 and a second snap ring 61 to provide a fulcrum surface for the spring. Centrifugal weights 62 are mounted in circumferentially spaced slots between the fingers 57 of the Belleville spring for a purpose to be later described.

The surface of the pressure plate 37 facing the pressure disc 53 has an annular groove formed intermediate the inner and outer diameters thereof to receive a second pressure ring 63 engaged by the approximate midpoint of the Belleville spring 56 between the inner ends of fingers 57 and the periphery 58 of the Belleville spring 56. Also, a retractor disc 64, formed of a resilient material, has its inner diameter 65 received in an annular groove in the piston 22 (FIG. 2), the inner portion of which lies parallel and closely adjacent the inner portion of pressure disc 53, and the outer diameter of the disc engages the inner lip 38 on the pressure plate 37. The outer edge of the disc is scalloped at 66 (see FIG. 1) so as to substantially mask off the area behind the pressure plate from the cooling oil.

Hydraulic fluid under pressure is supplied from a throttle-induced pump (not shown) in the vehicle drive system through a conduit 67 extending into and secured in the passage 15 to actuate the piston 22 in pressure chamber 21. Also, the complete assembly 10 has a housing (not shown) encompassing the assembly, and a source of cooling fluid is available at the right-hand end of the assembly as shown by arrow A in FIG. 2 to cool the friction surfaces of the clutch plate, pressure plate and end plate; the pressure plate 37 and end plate 32 both being relatively thick to provide an adequate heat sink to handle short but high-powered clutch engagements. As the variable transmission pulleys are accelerated from idle rpm, the fluid pump increases the hydraulic pressure applied through conduit 67 and passages 15, 16 and 19 to the pressure chamber 21 to urge the piston 22 and the pressure disc 53 to the right as seen in FIG. 2. The disc 53 acts through the first pressure ring 55 upon the fingers 57 of the Belleville spring 56, which in turn delivers force through the second pressure ring 63 to urge the pressure plate 37 against the friction clutch plate 41 to engage the end plate 32 and cause rotation of the sleeve shaft 45 to drive the vehicle wheels upon being coupled to rotation of the driving shaft 11.

The Belleville spring is so proportioned as to allow no piston movement until a predetermined piston pressure is developed, and then with a very small increase in pressure, the spring allows the piston to quickly move all the way to the clutch-engaged position. Variations in installed load are corrected through the sizing of the first pressure ring 55. The centrifugal weights 62 mounted in the spring slots provide a centrifugal biasing force to the apply system to compensate for the centrifugal effect of the oil in the pressure chamber 21. As an example, at 10,000 rpm, the centrifugally inspired force tending to add to the clutch engaging force can be as high as 1,000 pounds and, unless compensation is provided, will prevent the vehicle operator from disengaging the clutch at high speed when the situation dictates. Also, it is difficult to keep the clutch capacity in its proper relationship to the transmission belt capacity for the pulleys if centrifugal hydraulic forces are allowed to interfere. The continuous compensation provided by the weighted Belleville spring enables the clutch to function as a "fuse" in a precise way.

The Belleville spring serves the following functions:
(1) It acts as a return spring.
(2) It multiplies the piston force by a factor of approximately 2 to 1.
(3) It imposes the clutch engaging force through the second pressure ring at about the radial mid-point of the friction members.
(4) It provides for a cushioning effect during clutch engagement enhancing shift smoothness due to the springiness of the spring fingers.

When the operator releases the throttle during operation of the vehicle, the hydraulic pressure rapidly decreases and the Belleville spring 56, in conjunction with the retractor disc 64, acts to retract the piston 22 and disengage the clutch plate cleanly sufficiently to prevent vehicle creep. The clutch must be disengageable at 10,000 rpm by taking the operator's foot off the throttle to avoid engine overspeed under conditions of electronic control failure.

Although shown and described as a starting clutch for a continuously variable transmission, it is obvious that this clutch can be utilized in other transmission arrangements where a starting clutch is necessary or desirable.

We claim:
1. A starting clutch for a continuously variable transmission adapted to engage upon a signal from a throttle induced system oil pressure to couple a driving shaft with a driven concentric sleeve shaft, comprising a hub operatively connected to rotate with the continuously rotating driving shaft, a clutch cover secured to said hub and having an axial flange portion, said hub having an annular pressure chamber formed therein receiving an axially reciprocable piston, a clutch plate carrying friction facings, a second hub operatively connected to the sleeve shaft and secured to the clutch plate, an end plate operatively connected to said axial flange portion, an axially reciprocable pressure plate operatively connected to rotate with said axial flange portion, a Belleville spring pivotally mounted in said cover and actuated by said piston to engage said pressure plate and urge it against the clutch plate located between the pressure plate and end plate, said Belleville spring hav- ing a plurality of inwardly extending fingers separated by generally radial slots, a source of hydraulic pressure communicating with said pressure chamber, and a plurality of centrifugal weights received in at least some of the slots to counterbalance the centrifugal force of the hydraulic fluid in the pressure chamber.

2. A starting clutch as set forth in claim 1, including a pressure ring between the Belleville spring and pressure plate so that pressure is applied at about the radial mid-point of the friction clutch facings.

3. A starting clutch as set forth in claim 1, including a pressure disc operatively connected with said piston and having an outwardly and forwardly inclined outer portion, the periphery thereof operatively engaging the inner edge of said Belleville spring.

4. A starting clutch as set forth in claim 1, wherein a retractor disc is operatively connected to said piston at its inner periphery and is operatively connected at its outer periphery to a lip on the inner diameter of the pressure plate.

5. A starting clutch as set forth in claim 1, in which indented flattened ribs are formed in the cover flange circumferentially spaced therearound, and said pressure plate and end plate have complementary flattened channels in the peripheries thereof conformably receiving said ribs.

6. A starting clutch as set forth in claim 5, including a snap ring received in a groove adjacent the outer end of the cover flange to retain the end plate therein.

7. A starting clutch as set forth in claim 1, in which said cover has a corner at the inner end of the axial flange, and a snap ring is located in a groove spaced from said corner, the periphery of said Belleville spring being located between the corner and snap ring and fulcrumed therebetween.

8. A starting clutch for a continuously variable transmission adapted to engage upon a signal from a throttle induced system oil pressure to couple a driving shaft with a driven concentric sleeve shaft, comprising a hub operatively connected to rotate with the continuously rotating driving shaft, a clutch cover secured to said hub and having an axial flange portion, said hub having an annular pressure chamber formed therein receiving an axially reciprocable piston, a clutch plate carrying friction facings, a second hub operatively connected to the sleeve shaft and secured to the clutch plate, an end plate operatively connected to said axial flange portion, an axially reciprocable pressure plate operatively connected to rotate with said axial flange portion, a Belleville spring pivotally mounted in said cover and actuated by said piston to engage said pressure plate and urge it against the clutch plate located between the pressure plate and end plate, a pressure disc operatively connected with said piston and having an outwardly and forwardly inclined outer portion, the periphery of said pressure disc having a curled edge receiving a pressure ring engaging the inner edge of said Belleville spring, and a source of hydraulic pressure communicating with said pressure chamber.

9. A starting clutch for a continuously variable transmission adapted to engage upon a signal from a throttle induced system oil pressure to couple a driving shaft with a driven concentric sleeve shaft, comprising a hub operatively connected to rotate with the continuously rotating driving shaft, a clutch cover secured to said hub and having an axial flange portion, said hub having an annular pressure chamber formed therein receiving an axially reciprocable piston, a clutch plate carrying friction facings, a second hub operatively connected to the sleeve shaft and secured to the clutch plate, an end plate operatively connected to said axial flange portion, an axially reciprocable pressure plate operatively connected to rotate with said axial flange portion, a Belleville spring including inwardly extending spring fingers separated by radial slots with its outer edge being pivotally mounted in said clutch cover and actuated by said piston to engage said pressure plate and urge it against the clutch plate located between the pressure plate and end plate, a plurality of circumferentially equally spaced centrifugal weights recveived in several of said slots, a pressure disc operatively connected to said piston and having an outwardly and forwardly inclined outer portion terminating in a curled edge, a first pressure ring received in said curled edge and engaging the inner ends of the spring fingers, a second pressure ring positioned between said Belleville spring and pressure plate, a retractor disc operatively connected to said piston adjacent said pressure disc at its inner edge and operatively connected at its outer edge to a lip on the inner periphery of said pressure plate, a snap ring in said axial flange portion adjacent the outer edge thereof retaining said end plate in the cover, said axial flange portion having circumferentially spaced inwardly flattened ribs formed therein and said pressure plate and end plate having complementary channels in their peripheries receiving said ribs, and a source of hydraulic pressure communicating with said pressure chamber.

* * * * *